US006833427B2

(12) United States Patent
Kawano et al.

(10) Patent No.: US 6,833,427 B2
(45) Date of Patent: Dec. 21, 2004

(54) POLYCARBONATE RESIN MOLDING MATERIAL FOR OPTICAL USE

(75) Inventors: Shinzi Kawano, Tokyo (JP); Fumi Izumi, Tokyo (JP)

(73) Assignee: Teijin Chemicals, Ltd., Tokyo (JP)

( * ) Notice: Subject to any disclaimer, the term of this patent is extended or adjusted under 35 U.S.C. 154(b) by 30 days.

(21) Appl. No.: 10/333,214

(22) PCT Filed: May 16, 2002

(86) PCT No.: PCT/JP02/04738

§ 371 (c)(1),
(2), (4) Date: Jan. 21, 2003

(65) Prior Publication Data

US 2003/0216538 A1 Nov. 20, 2003

(30) Foreign Application Priority Data

May 18, 2001 (JP) ........................................ 2001-148899
Jul. 30, 2001 (JP) ........................................ 2001-229292

(51) Int. Cl.[7] ............................................. C08G 64/00
(52) U.S. Cl. ............... 528/196; 264/176.1; 264/211.24; 264/219; 359/642; 359/109; 428/64
(58) Field of Search ............................... 528/196, 198; 264/211.24, 176.1, 219; 359/109, 642; 428/64

(56) References Cited

U.S. PATENT DOCUMENTS

| 5,059,461 A | * 10/1991 | Kojima et al. ............. 428/64.7 |
| 5,156,860 A | * 10/1992 | Kojima et al. ............. 425/200 |
| 5,717,055 A | 2/1998 | Hosomi et al. |
| 6,066,398 A | 5/2000 | Ueda |

FOREIGN PATENT DOCUMENTS

| EP | 0 300 485 | 1/1989 |
| EP | 0 489 361 | 6/1992 |
| EP | 0 892 005 | 1/1999 |
| EP | 0 947 538 | 10/1999 |
| EP | 1 174 235 | 1/2002 |
| JP | 60-184814 | 9/1985 |
| JP | 62-160210 | 7/1987 |
| JP | 63-003021 | 1/1988 |
| JP | 05-092422 | 4/1993 |
| JP | 05-239332 | 9/1993 |
| JP | 07-009439 | 1/1995 |
| JP | 7-52272 | 2/1995 |
| JP | 08-039551 | 2/1996 |
| JP | 08-057850 | 3/1996 |
| JP | 08-067749 | 3/1996 |
| JP | 08-073604 | 3/1996 |
| JP | 09-029738 | 2/1997 |
| JP | 11-035692 | 2/1999 |
| JP | 11-058373 | 3/1999 |
| JP | 2000-234052 | 8/2000 |
| JP | 2000-242971 | 9/2000 |
| JP | 2000-280238 | 10/2000 |
| JP | 2000-319378 | 11/2000 |
| JP | 2000-351115 | 12/2000 |
| JP | 2001-055436 | 2/2001 |
| JP | 2001-138321 | 5/2001 |
| JP | 2001-225323 | 8/2001 |
| JP | 2001-269929 | 10/2001 |
| JP | 2001-335627 | 12/2001 |
| JP | 2001-338436 | 12/2001 |
| JP | 2002-121375 | 4/2002 |
| JP | 2002-187945 | 7/2002 |
| JP | 2002-212410 | 7/2002 |

* cited by examiner

*Primary Examiner*—Terressa Boykin
(74) *Attorney, Agent, or Firm*—Wenderoth, Lind & Ponack, LLP

(57) ABSTRACT

A polycarbonate resin molding material for optical use which is pellets formed from a polycarbonate resin and having a bulk density of 0.72 kg/l or more and an optical disk substrate formed therefrom.

According to the present invention, use of the above pellets makes it possible to obtain an optical disk substrate which rarely experiences the production of a silver streak, reduce the molding cycle and smoothen the molding operation.

17 Claims, 1 Drawing Sheet

POLYCARBONATE RESIN MOLDING MATERIAL FOR OPTICAL USE

FIELD OF THE INVENTION

The present invention relates to a molding material for optical use, for example, a resin molding material suitable for the manufacture of an optical recording medium for recording various information signals such as voice signals or image signals and to a substrate obtained therefrom.

DESCRIPTION OF THE PRIOR ART

Optical disks for recording and reproducing information through exposure to a laser beam, such as digital audio disks (so-called compact disks), optical video disks (so-called laser disks), recordable disks, opto-magnetic disks and phase-change disks have been implemented.

Out of these, the compact disks and the laser disks are read-only memory (ROM) type optical disks. Generally these optical disks have pits corresponding to information signals on a transparent resin substrate and an aluminum (Al) reflection layer as thick as 40 nm or more formed on the substrate. In these optical disks, a change in reflectance caused by an optical interference produced by a pit is detected to reproduce an information signal.

Meanwhile, the recordable optical disks are optical disks to which desired information can be written by a user and the opto-magnetic disks and the phase-change type disks are RAM (random access memory) type optical disks to which desired information can be written repeatedly.

That is, the recordable optical disks comprise a transparent resin substrate and a recordable recording layer thereon whose optical properties are changed irreversibly by exposure to a laser beam or whose surface becomes uneven by exposure to a laser beam. This recording layer is made from a cyanine-based, phthalocyanine-based or azo-based organic dye which is decomposed by heat from exposure to a laser beam to change its optical constant and causes the deformation of the substrate through its volume change.

The opto-magnetic disks are rewritable optical disks in which information can be written and erased by a user repeatedly and which comprise a vertically magnetized layer having a magneto-optical effect (for example, Kerr effect), such as a Tb—Fe—Co amorphous alloy thin film, formed on a transparent resin substrate. A recording pit is formed in this opto-magnetic disk by magnetizing a micro-area corresponding to an information signal of the vertically magnetized layer in an upward direction or a downward direction. The information signal is reproduced, making use of the fact that the rotation angle θk (Kerr rotation angle) of linear polarization of reflected light differs according to the magnetization direction of the vertically magnetized layer.

The phase-change disks are rewritable disks like the opto-magnetic disks and a Ge—Sb—Te phase-change material which is initially crystalline and becomes amorphous upon exposure to a laser beam is used therein, for example. In this recording layer, a recording pit is formed by changing the phase of a micro-area corresponding to an information signal and the difference in reflectance between an amorphous portion corresponding to the pit and other crystalline portion is detected to reproduce the information signal.

The above opto-magnetic disks and phase-change disks have a four-layer structure consisting of a recording layer, transparent dielectric layers sandwiching the recording layer and an aluminum (Al) reflection layer formed thereon in order to prevent the oxidation of the recording layer and increase the modulation degree of a signal by multiple interference in most cases. The dielectric layers are a silicon nitride layer or Zn—$SiO_2$ mixed film.

Studies are being made energetically to use the above optical disks for recording digital images. A digital versatile disk (DVD) has been developed as such an optical disk.

This DVD has the same diameter of 120 mm as CD and is designed to record image information equivalent to one movie and reproduce high-quality image information equivalent to that of the current TV.

A recording capacity 6 to 8 times greater than CD is required to record such image information on an optical disk. Therefore, the wavelength of a laser beam is reduced to 635 to 650 nm in DVD compared with 780 nm of CD and the numerical aperture NA of an objective lens is increased to 0.52 or 0.6 in DVD compared with 0.45 of CD in order to reduce the track pitch and the shortest recording mark length of pits, thereby raising recording density.

Out of these, an increase in the numeral aperture NA of the object lens reduces the warp tolerance of a disk substrate. The thickness of the substrate of DVD is reduced to 0.6 mm which is much smaller than 1.2 mm of CD in order to shorten the distance of a laser beam passing through the disk substrate so as to compensate for a reduction in the warp tolerance. To compensate for a reduction in the strength of the disk resulted by the reduced thickness of the substrate, as described in JP-A 6-274940 (the term "JP-A" as used herein means an "unexamined published Japanese patent application"), a bonding-together structure that another substrate is bonded on the recording layer formed on the substrate is adopted. The recording layer of the laminated optical disk may be a ROM type recording layer, recordable type recording layer or RAM type recording layer which is used in the above single-substrate structure.

Further, the bonded optical disk is available in a one-side bonded optical disk in which only one side is used and both-side bonded optical disk in which both sides are used.

A polycarbonate resin which is excellent in moldability, strength, light transmission and humidity resistance is widely used in the above optical disk resin substrates.

Since an optical disk makes use of micro-irregularities formed on a resin substrate to record or reproduce information by a laser beam, when a defect existent in the resin substrate is larger than each irregularity, it has a great influence on the reliability of information recording or reproduction. Therefore, the production of a silver streak which is such a defect must be suppressed.

The causes of producing a silver streak include the hydrolysis of a resin pellet due to incomplete drying, thermal decomposition in a cylinder and the inclusion of air from a hopper side. As means of suppressing the production of a silver streak caused by the inclusion of air, it has been proposed to limit the length of a pellet (JP-A 7-52272) and to limit the length and long diameter of a pellet (JP-A 11-35692). However, no explanation is given of the bulk density of pellets in these proposals and the bulk density cannot be set to a suitable range simply by limiting the length and long diameter of each pellet in these proposals.

Problem to be Solved by the Invention

The present invention has been made in view of the above problems and intensive studies have been made on the problems. As a result, it has been found that the production of a silver streak is suppressed by setting the bulk density value of pellets to a certain range and that use of the pellets can reduce the metering time, can shorten the molding cycle, prevents a pellet feed trouble and smoothen molding operation. The present invention has been accomplished by these findings.

Means for Solving the Problems

According to the present invention, there are provided a polycarbonate resin molding material for optical use which is pellets formed from a polycarbonate resin and having (1) a bulk density of 0.72 kg/l (liter) or more, and an optical disk substrate formed from the material.

DETAILED DESCRIPTION OF THE PREFERRED EMBODIMENT

In the present invention, a detailed description is given of pellets of an aromatic polycarbonate resin as a molding material suitable for molding a substrate for improving the reliability of information recording and reproduction as an optical disk substrate for digital versatile disks (DVD) typified by CD-R, CD-RW, MO, DVD-ROM, DVD-Audio, DVD-R and DVD-RAM, particularly a high-density optical disk substrate for DVD.

The polycarbonate resin used in the present invention is generally obtained by reacting a diphenol with a carbonate precursor by an interfacial polymerization or ester exchange (melt polymerization) method. Typical examples of the diphenol used include hydroquinone, resorcinol, 4,4'-dihydroxydiphenyl, bis(4-hydroxyphenyl)methane, bis{(4-hydroxy-3,5-dimethyl)phenyl}methane, 1,1-bis(4-hydroxyphenyl)ethane, 1,1-bis(4-hydroxyphenyl)-1-phenylethane, 2,2-bis(4-hydroxyphenyl)propane (generally called bisphenol A), 2,2-bis{(4-hydroxy-3-methyl)phenyl}propane, 2,2-bis{(4-hydroxy-3,5-dimethyl)phenyl}propane, 2,2-bis{(3,5-dibromo-4-hydroxy)phenyl}propane, 2,2-bis{((3-isopropyl-4-hydroxy)phenyl}propane, 2,2-bis{(4-hydroxy-3-phenyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,4-bis(4-hydroxyphenyl)-2-methylbutane, 2,2-bis(4-hydroxyphenyl)pentane, 2,2-bis(4-hydroxyphenyl)-4-methylpentane, 1,1-bis(4-hydroxyphenyl)cyclohexane, 1,1-bis(4-hydroxyphenyl)-4-isopropylcyclohexane, 1,1-bis(4-hydroxyphenyl)-3,3,5-trimethylcyclohexane, 9,9-bis(4-hydroxyphenyl)fluorene, 9,9-bis{(4-hydroxy-3-methyl)phenyl}fluorene, α,α'-bis(4-hydroxyphenyl)-o-diisopropylbenzene, α,α'-bis(4-hydroxyphenyl)-m-diisopropylbenzene, α,α'-bis(4-hydroxyphenyl)-p-diisopropylbenzene, 1,3-bis(4-hydroxyphenyl)-5,7-dimethyladamantane, 4,4'-dihydroxydiphenyl sulfone, 4,4'-dihydroxydiphenyl sulfoxide, 4,4'-dihydroxydiphenyl sulfide, 4,4'-dihydroxydiphenyl ketone, 4,4'-dihydroxydiphenyl ether and 4,4'-dihydroxydiphenyl ester. They may be used alone or in admixture of two or more.

Out of these, homopolymers and copolymers obtained from at least one bisphenol selected from the group consisting of bisphenol A, 2,2-bis{(4-hydroxy-3-methyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,2-bis(4-hydroxyphenyl)-4-methylpentane, 1,1-bis(4-hydroxyphenyl)-3,3,5-trimethylcyclohexane and α,α'-bis(4-hydroxyphenyl)-m-diisopropylbenzene are preferred, and a homopolymer of bisphenol A and a copolymer of 1,1-bis(4-hydroxyphenyl)-3,3,5-trimethylcyclohexane and bisphenol A, 2,2-bis{(4-hydroxy-3-methyl)phenyl}propane or α,α'-bis(4-hydroxyphenyl)-m-diisopropylbenzene are particularly preferred. Particularly, a homopolymer of bisphenol A has an excellent utility value.

The carbonate precursor is a carbonyl halide, carbonate ester, haloformate or the like. Specific examples of the carbonate precursor include phosgene, diphenyl carbonates and dihaloformates of diphenols.

A catalyst and an antioxidant for the diphenol may be used to produce a polycarbonate resin by reacting the above diphenol with the above carbonate precursor by the interfacial polymerization or ester exchange method. The polycarbonate resin may be a branched polycarbonate resin obtained by copolymerizing a polyfunctional aromatic compound having a functionality of 3 or more, a polyester carbonate resin obtained by copolymerizing an aromatic or aliphatic difunctional carboxylic acid, or a mixture of two or more of the obtained polycarbonate resins.

The reaction which is carried out by the interfacial polymerization method is generally a reaction between a diphenol and phosgene in the presence of an acid binder and an organic solvent. The acid binder is selected from an alkali metal hydroxide such as sodium hydroxide or potassium hydroxide and an amine compound such as pyridine. The organic solvent is a hydrocarbon halide such as methylene chloride or chlorobenzene. To promote the reaction, a catalyst selected from a tertiary amine, quaternary ammonium compound and quaternary phosphonium compound such as triethylamine, tetra-n-butylammonium bromide or tetra-n-butylphosphonium bromide may be used. The reaction temperature is generally 0 to 40° C., the reaction time is 10 minutes to 5 hours and pH during the reaction is preferably maintained at 9 or more.

The reaction which is carried out by the ester exchange method is generally a reaction between a diphenol and a carbonate ester which is carried out by mixing together the diphenol and carbonate ester under heating in the presence of an inert gas and distilling out the formed monohydroxy compound (such as phenol). The reaction temperature which differs according to the boiling point of the formed monohydroxy compound is generally 120 to 350° C. The pressure of the reaction system is reduced to 10 to 0.1 Torr in the latter stage of the reaction to make it easy to distill out the formed monohydroxy compound. Since the monohydroxy compound formed during the reaction remains in the polycarbonate resin, a sufficiently reaction time is necessary, specifically 1 to 4 hours.

The carbonate ester is an ester such as an allyl group having 6 to 10 carbon atoms, aralkyl group or alkyl group having 1 to 4 carbon atoms all of which may be substituted. Specific examples of the carbonate ester include diphenyl carbonate, ditolyl carbonate, bis(chlorophenyl)carbonate, m-cresyl carbonate, dinaphthyl carbonate, bis(diphenyl) carbonate, dimethyl carbonate, diethyl carbonate and dibutyl carbonate. Out of these, diphenyl carbonate is preferred.

A polymerization catalyst may be used to accelerate the polymerization speed. Examples of the polymerization catalyst include alkali metal compounds such as sodium hydroxide, potassium hydroxide and sodium salts and potassium salts of diphenols, alkali earth metal compounds such as calcium hydroxide, barium hydroxide and magnesium hydroxide, nitrogen-containing basic compounds such as tetramethylammonium hydroxide, tetraethylammonium hydroxide, trimethylamine and triethylamine, alkoxides of alkali metals and alkali earth metals, organic acid salts of alkali metals and alkali earth metals, zinc compounds, boron compounds, aluminum compounds, silicon compounds, germanium compounds, organic tin compounds, lead compounds, osmium compounds, antimony compounds, manganese compounds, titanium compounds and zirconium compounds all of which are generally used for esterification reaction and ester exchange reaction. The above catalysts may be used alone or in combination of two or more. The amount of the polymerization catalyst is preferably $1 \times 10^{-8}$ to $1 \times 10^{-4}$ equivalent, more preferably $1 \times 10^{-7}$ to $5 \times 10^{-4}$ equivalent based on 1 mol of the raw material diphenol.

To reduce the number of the phenolic terminal groups in the polymerization reaction, a terminal capping agent other than a monofunctional phenol, such as bis(chlorophenyl) carbonate, bis(bromophenyl)carbonate, bis(nitrophenyl) carbonate, bis(phenylphenyl)carbonate, chlorophenylphenyl carbonate, bromophenylphenyl carbonate, nitrophenylphenyl carbonate, phenylphenyl carbonate, methoxycarbonylphenylphenyl carbonate or ethoxycarbonylphenylphenyl carbonate, is preferably added in the latter stage of the polycondensation reaction or after the end of the reaction. Out of these, 2-chlorophenylphenyl carbonate and 2-methoxycarbonylphenylphenyl carbonate are preferred, and 2-methoxycarbonylphenylphenyl carbonate is particularly preferred.

The molecular weight of the polycarbonate resin is preferably 10,000 to 22,000, more preferably 12,000 to 20,000, particularly preferably 13,000 to 18,000 in terms of viscosity average molecular weight (M). The polycarbonate resin having the above viscosity average molecular weight has sufficiently high strength as a material for optical use and excellent melt fluidity at the time of molding and is free from molding distortion. The viscosity average molecular weight in the present invention is obtained by inserting a specific viscosity ($\eta_{sp}$) obtained from a solution containing 0.7 g of a polycarbonate resin dissolved in 100 ml of methylene chloride at 20° C. into the following equation.

$\eta_{sp}/c = [\eta] + 0.45 \times [\eta]^2 c$ ([$\eta$] represents a limiting viscosity)

$[\eta] = 1.23 \times 10^{-4} M^{0.83}$ $c = 0.7$

The pellets of the present invention are preferably polycarbonate resin pellets produced by the above ester exchange method and a polycarbonate resin containing a phenolic hydroxyl group (OH group) at a terminal in an amount of 5 to 100 equivalents, preferably 10 to 70 equivalents based on 1 ton of the resin is advantageous as the polycarbonate resin.

After the polycarbonate resin is produced by a conventionally known method (interfacial polymerization method, ester exchange method, etc.), it is preferred to remove impurities and foreign matter such as a low molecular weight component and unreacted components by carrying out alkali extraction or filtration in a solution state, or by washing a granulated resin after granulation (removal of the solvent) with a polycarbonate poor solvent or non-solvent exemplified by a ketone such as acetone, aliphatic hydrocarbon such as hexane and aromatic hydrocarbon such as xylene. In the extrusion step (pelletizing step) for obtaining polycarbonate resin pellets to be injection molded, it is preferred to remove foreign matter by passing a polycarbonate resin through a sintered metal filter having a filtration accuracy of 10 μm while it is molten. If necessary, a release agent such as a polyhydric alcohol fatty acid ester, an antioxidant such as phosphorus-based antioxidant and other additives are preferably added. In either case, the contents of foreign matter, impurities and solvent in the raw material resin before injection molding (before the pelletizing step) must be reduced as much as possible.

Pellets can be produced by extruding the polycarbonate resin into a strand by a melt extruder, passing it into a cooling bath filled with hot water to be cooled and cutting it with a cutter.

The pellets which satisfy conditions specified in the present invention can be obtained by selecting means and conditions for the preparation of the pellets and optionally suitably carrying out the operation of selecting the obtained pellets.

That is, the pellets of interest can be obtained by suitably selecting preparation means and conditions such as the shape of a die hole in the melt extruder, melt extrusion temperature, the amount of extrusion, the temperature and temperature distribution of cooling water, the take-off tension of the strand; the take-off speed of the strand, the rotation speed of the cutter, the temperature of the strand at the time of cutting, the condition of the blade of the cutter and clearance. Since the obtained pellets include powders, small pieces and coarse pellets for unsuccessful cutting, it is desired to remove these. To this end, the operation of selecting the pellets is desirably carried out to obtain pellets uniform in shape. This selection operation is carried out using a punching metal or sieve for example.

The pellets of the molding material (aromatic polycarbonate resin) of the present invention must have a bulk density of 0.72 kg/l or more.

When the pellets have a bulk density of 0.72 kg/l or more, the production of a silver streak can be suppressed, the reliability of information recording can be improved, and the metering time can be shortened. When the bulk density of the above pellets is outside the above range, a silver streak is produced, the high reliability of information recording and reproduction is not obtained, and the metering time cannot be shortened.

The bulk density is 0.72 kg/l or more, preferably 0.73 kg/l or more, more preferably 0.74 kg/l or more because a positive effect can be obtained. The upper limit of bulk density is calculated to be 0.88 kg/l based on the specific gravity and the closest packing rate of a polycarbonate based on the assumption that the pellets are spherical. However, it changes according to the shape characteristics and grain size distribution of the pellets. In general, the upper limit of bulk density is 0.80 kg/l. The pellets have a circular, oval or rectangular cross section, a length of 2.5 to 3.5 mm and a weight of 8 to 35 mg.

It has been found from researches conducted by the inventors of the present invention that when the pellets have a bulk density of 0.72 kg/l or more, the production of a silver streak can be suppressed and that the size and ratio of air bubbles contained in the pellets are also connected with the production of a silver streak.

That is, the aromatic polycarbonate resin pellets which are the molding material of the present invention have an air bubble evolution ratio of 35% or less, a maximum air bubble volume of 2.0 mm³ or less and an air bubble volume ratio of 2.0% or less, advantageously.

When the air bubble evolution ratio in the pellets is reduced to 35% or less, the maximum air bubble volume is reduced to 2.0 mm³ or less and the air bubble volume ratio is reduced to 2.0% or less, the production of a silver streak is further suppressed and the reliability of information recording can be improved.

The air bubble evolution ratio in the pellets is the ratio of the number of pellets containing air bubbles (or voids) to the total number of pellets. The maximum air bubble volume is the largest volume of air bubbles (voids) in one pellet and the air bubble volume ratio is the ratio of the total volume of air bubbles (voids) in the pellets to the total volume of the pellets. The air bubbles (voids) have a volume of 0.01 mm³ or more.

When the pellets have an air bubble evolution ratio of 35% or less, preferably 30% or less, more preferably 25% or less, a maximum air bubble volume of 2.0 mm³ or less, preferably 1.5 mm³ or less, more preferably 1.0 mm³ or less, and an air bubble volume ratio of 2.0% or less, preferably 1.5% or less, more preferably 1.0% or less, its effect becomes positive.

It has been found from researches conducted by the inventors of the present invention that the average weight value of the pellets and its standard deviation have an influence on the manufacture of an optical disk substrate which rarely experiences the production of a silver streak. That is, when the average weight value of the pellets is 13 to 26 mg, preferably 14 to 24 mg, more preferably 15 to 20 mg and its standard deviation is 2.2 mg or less, preferably 2.0 mg or less, more preferably 1.8 mg or less, its effect becomes more positive.

Further, researches conducted by the inventors of the present invention also have revealed that when the average value of the long diameter to short diameter ratio (to be referred to as "long diameter/short diameter ratio" hereinafter) of the cut section of the pellets is 1.3 to 1.7 and its standard deviation is 0.08 to 0.15, the production of a silver streak can be further reduced and the operation of molding becomes smoother. The long diameter of the cut section of each pellet is the length (mm) of the longest diameter of the cut section and the short diameter is the length (mm) of the shortest diameter of the cut section.

When the average value of the long diameter/short diameter ratio of the cut section of the pellets is set to 1.3 to 1.7 and its standard deviation is set to 0.08 to 0.15, the production of a silver streak is suppressed and the reliability of information recording can be improved in the pellets. When the long diameter/short diameter ratio is outside the above range, a silver streak is produced and the high reliability of information recording and reproduction is not obtained.

When the average value of long diameter/short diameter ratio is 1.3 to 1.7, preferably 1.4 to 1.6, a more positive effect can be obtained. When the standard deviation of the ratio is 0.08 to 0.15, preferably 0.10 to 0.13, a more positive effect can be obtained.

The pellets of the present invention have a repose angle of 23 to 28°, preferably 24 to 27°, more preferably 25 to 26° at the time of accumulation because the production of a silver streak can be suppressed more, the reliability of information recording can be improved advantageously, and the operation of molding becomes smooth. The repose angle of the pellets is a value calculated from the following expression by dropping the pellets on a 13 cm-diameter polycarbonate disk from a height of 5 cm to be piled up and measuring the height (H) of the conically piled layer of the pellets.

Repose angle $\Phi(°) = \tan^{-1}(H/6.5)$

An injection molding machine (including an injection compression molding machine) is used to produce an optical disk substrate from the polycarbonate resin pellets. A commonly used injection molding machine may be used but an injection molding machine whose cylinder and screws are made from a material having low adhesion to resins and corrosion resistance and abrasion resistance is preferably used in order to suppress a production of carbides and to improve reliability of disk substrate. Injection molding conditions include a cylinder temperature of 300 to 400° C. and a mold temperature of 50 to 140° C. and the injection molding atmosphere is preferably as clean as possible. It is important that pellets to be molded should be dried completely so as to remove water and care must be taken to prevent residence which may cause the decomposition of a resin. It is also important that a substrate having abnormal birefringence and mechanical properties should not be used as a product or test substrate.

An optical disk substrate formed from the polycarbonate resin molding material for optical use (pellets) of the present invention rarely experiences the production of a silver streak and is excellent as a substrate for optical disks of digital versatile disks (DVD) typified by CD-R, CD-RW, MO, digital video disks, DVD-ROM, DVD-Audio, DVD-R and DVD-RAM, particularly a substrate for DVDs.

BRIEF DESCRIPTIONS OF THE DRAWINGS

EXPLANATIONS OF SYMBOLS

Figure 2:
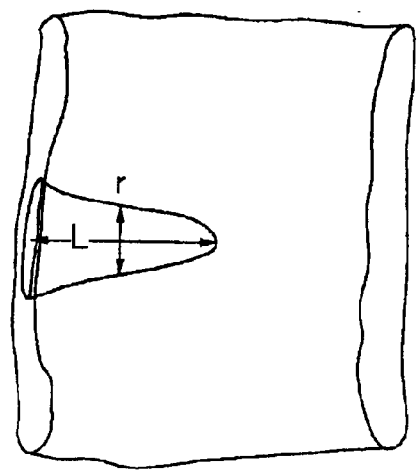
FIG. 2 is a schematic diagram of a semi-cylindrical air bubble contained in a pellet when the pellet is observed from the side.
Figure 3:
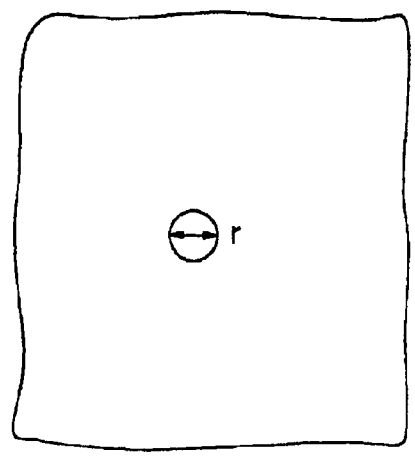
FIG. 3 is a schematic diagram of a spherical air bubble contained in a pellet when the pellet is observed from the side.

L: length in a horizonal direction of the cylindrical air bubble (FIG. 1) or the semi-cylindrical air bubble (FIG. 2)
r: length in a vertical direction (diameter) of the cylindrical air bubble (FIG. 1), length in a vertical direction (diameter) at an intermediate point of L of the semi-cylindrical air bubble (FIG. 2) or length (diameter) of the spherical air bubble (FIG. 3)

EXAMPLES

The following examples are provided for the purpose of further illustrating the present invention but are in no way to be taken as limiting. Examples 1 to 5 and Comparative Examples 1 to 5

Polycarbonate resin pellets in Examples and Comparative Examples were cylindrical pellets having an oval cross section obtained by extruding a resin formed by the ester exchange or interfacial polymerization method into a strand by a melt extruder, passing it through a cooling tank filled with hot water to be cooled and cutting it with a cutter. Pellets having characteristic properties shown in Table 1 were obtained by suitably selecting pellet preparation conditions such as the temperature of cooling water, the shape of a die hole, take-off tension, take-off speed, the rotation speed of the cutter blade and the temperature of the strand at the time of cutting and conditions for selecting pellets by a punching metal or a sieve.

The pellets used in these Examples and Comparative Examples had a length, a long diameter and a short diameter of the section and a standard deviation thereof within the following ranges.

Average value of pellet lengths: 2.8 to 3.2 mm
Average value of long diameters of pellet sections: 3.0 to 3.4 mm
Average value of short diameters of pellet sections: 2.2 to 2.5 mm
Standard deviation of the above values: 0.15 mm or less The characteristic properties of the pellets were measured by the following methods. The molding of a substrate and the measurement of a silver streak were carried out by the following methods.

(1) Measurement of Bulk Density

Pellets were dropped into a SUS cylindrical vessel having a height of 8.6 cm, a capacity of 100 ml and a weight of 150 g from a height of 5 cm continuously until they overflowed. Thereafter, the pile of the pellets was leveled off by a plastic board, the weight of the SUS vessel filled with the pellets was measured, and the bulk density of the pellets was calculated from the following expression.

$$D=(Z-150)/100$$

D: bulk density (kg/l)
Z: weight (g) of a SUS vessel filled with pellets (2) Measurement of Long Diameter/Short Diameter Ratio The long diameters (a) and the short diameters (b) of the sections of 300 pellets were measured with a micrometer to calculate the long diameter/short diameter ratios (R). Thereafter, the average value and its standard deviation were calculated using the obtained results. The standard deviation was calculated based on the following expression.

$$\text{Standard deviation}=[\{\Sigma R^2-(\Sigma R)^2/300\}/299]^{1/2}$$

R: long diameter/short diameter ratio (3) Measurement of Weight

The weights of 300 pellets were measured with an electronic balance to calculate the average value of weights and its standard deviation. The standard deviation was calculated based on the following expression.

$$\text{Standard deviation}=[\{\Sigma M^2-(\Sigma M)^2/300\}/299]^{1/2}$$

M: weight (mg)

(4) Measurement of Air Bubble Evolution Ratio

The existence of an air bubble in 300 pellets was observed with the eye to calculate air bubble evolution ratio.

(5) Measurement of Maximum Air Bubble Volume (Vb)

Figure 1:
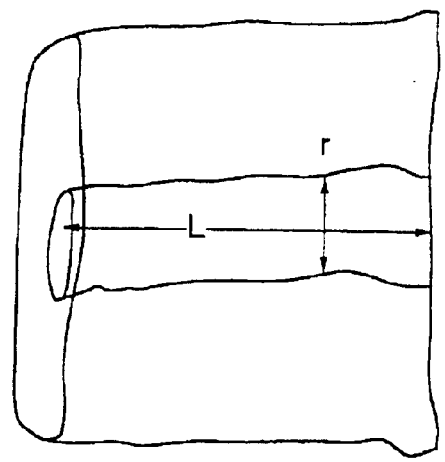
FIG. 1 is a schematic diagram of a cylindrical air bubble contained in a pellet when the pellet is observed from the side (right and left end portions shown on the drawing are cut sections, the same shall apply to FIG. 2 and FIG. 3)

(A) Cylindrical Air Bubble (FIG. 1 and FIG. 2)

An air bubble was observed from the side of each pellet with the digital HD microscope VH-7000 of Keyence Co., Ltd. to measure the length and width of the air bubble with a scale. The volume of the air bubble was calculated from the obtained result according to the following expression.

$$Vb=\pi \times (r/2) \times (r/2) \times L$$

Vb: volume (mm$^3$) of air bubble
r: length (mm) in the vertical direction of air bubble
L: length (mm) in the horizontal direction of air bubble (In FIG. 2, r is the length (mm) in a vertical direction at an intermediate point of the length L)

(B) Spherical Air Bubble (FIG. 3)

An air bubble was measured from the side of each pellet with the digital HD microscope VH-7000 of Keyence Co., Ltd. to measure its diameter with a scale. The volume of the air bubble was calculated from the obtained result according to the following expression.

$$Vb=4/3 \times \pi \times (r/2)^3$$

Vb: volume (mm$^3$) of air bubble
r: diameter of air bubble (mm)

(the diameter r of the air bubble in FIG. 3 is the average value of diameters in longitudinal and transverse directions)

The above operation was carried out on 300 pellets and the maximum value was taken as the maximum air bubble volume.

(6) Measurement of Air Bubble Volume Ratio (A) Calculation of Total Volume (Vp) of Pellets The long diameters (a) and short diameters (b) of the sections and the lengths (W) of 300 pellets were measured by means of micrometer and the total volume of the pellets was calculated from the following expression.

$$Vp=\pi \times (a/2) \times (b/2) \times W$$

Vp: volume (mm$^3$) of each pellet
a: long diameter (mm) of pellet section
b: short diameter (mm) of pellet section
W: length (mm) of each pellet (B) Calculation of Total Volume of Air Bubbles The total volume of air bubbles was calculated in the same manner as the maximum air bubble volume ratio.

(C) Calculation of Air Bubble Volume Ratio

The air bubble volume ratio was calculated from the following expression using the total volume of 300 pellets calculated in (A) and the total volume of air bubbles in 300 pellets which was calculated in (B).

$$R=(\Sigma Vb/\Sigma Vp) \times 100$$

R: air bubble volume ratio (%)
ΣVb: total volume of air bubbles in 300 pellets
ΣVp: total volume of 300 pellets (7) Silver Streak A DVD mold was attached to an injection molding machine [DISK 3M III of Sumitomo Heavy Industries, Ltd.] and a nickel DVD stamper having pits were mounted on this mold to feed pellets which were molding materials and were dried at 120° C. for 4 hours or more by a drier to the hopper of a molding machine automatically in order to mold 300 DVD substrates continuously at a cylinder temperature of 375° C. and a mold temperature of 113° C. Further, these substrates were observed with the eye to check if a silver streak was produced and the total number of silver streaks was calculated.

(8) Metering Time

A DVD mold was attached to an injection molding machine (DISK 3M III of Sumitomo Heavy Industries, Ltd.) and a nickel DVD stamper having pits were mounted on this mold to feed pellets which were molding materials and were dried at 120° C. for 4 hours or more by a drier to the hopper of a molding machine automatically in order to mold DVD substrates continuously at a cylinder temperature of 373° C. and a mold temperature of 114° C. The metering time of each molding was measured to calculate the average value of 50 shots.

TABLE 1

| | Bulk density (kg/L) | air bubble evolution ratio (%) | maximum air bubble volume (mm³) | air bubble volume ratio (%) | weight (g) Average | weight (g) standard deviation |
|---|---|---|---|---|---|---|
| Ex. 1 | 0.750 | 27.0 | 1.20 | 0.9 | 17.4 | 1.7 |
| Ex. 2 | 0.745 | 24.0 | 0.90 | 0.8 | 18.5 | 1.3 |
| Ex. 3 | 0.740 | 23.7 | 0.87 | 0.9 | 18.9 | 1.1 |
| Ex. 4 | 0.722 | 28.0 | 0.90 | 1.1 | 22.0 | 1.9 |
| Ex. 5 | 0.733 | 24.5 | 0.95 | 0.8 | 20.2 | 1.0 |
| C.Ex. 1 | 0.678 | 36.0 | 2.20 | 2.2 | 25.6 | 2.4 |
| C.Ex. 2 | 0.687 | 37.0 | 2.35 | 2.1 | 25.1 | 2.5 |
| C.Ex. 3 | 0.713 | 33.0 | 1.90 | 1.9 | 23.0 | 2.4 |
| C.Ex. 4 | 0.721 | 38.5 | 2.10 | 2.3 | 22.0 | 2.4 |
| C.Ex. 5 | 0.695 | 39.2 | 2.22 | 2.1 | 24.5 | 2.3 |

| | long diameter/short diameter ratio Average | long diameter/short diameter ratio standard deviation | production method | number of silver streaks | metering time (seconds) |
|---|---|---|---|---|---|
| Ex. 1 | 1.51 | 0.11 | A | 5 | 1.3 |
| Ex. 2 | 1.45 | 0.12 | B | 2 | 1.3 |
| Ex. 3 | 1.42 | 0.11 | A | 1 | 1.3 |
| Ex. 4 | 1.47 | 0.13 | A | 8 | 1.4 |
| Ex. 5 | 1.38 | 0.15 | A | 9 | 1.4 |
| C.Ex. 1 | 1.45 | 0.16 | A | 80 | 1.6 |
| C.Ex. 2 | 1.55 | 0.17 | B | 81 | 1.5 |
| C.Ex. 3 | 1.25 | 0.18 | A | 40 | 1.5 |
| C.Ex. 4 | 1.20 | 0.18 | A | 33 | 1.4 |
| C.Ex. 5 | 1.22 | 0.15 | A | 36 | 1.5 |

A: ester exchange method
B: interfacial polymerization method
Ex.: Example
C.Ex.: Comparative Example

What is claimed is:

1. A polycarbonate resin molding material for optical use in the form of pellets of a polycarbonate resin, and having (1) a bulk density of 0.72 kg/l or more and having (2) an air bubble evolution ratio of 35% or less, a maximum air bubble volume of 2.0 mm³ or less, and an air bubble volume ratio of 2.0% or less.

2. The polycarbonate resin molding material for optical use of claim 1, wherein the pellets have (3) an average weight value of 13 to 26 mg and a standard deviation thereof of 2.2 mg or less.

3. The polycarbonate resin molding material for optical use of claim 2, wherein the pellets have (4) an average value of the long diameter/short diameter ratios of cut sections referred to as "long diameter/short diameter ratio" of 1.3 to 1.7 and a standard deviation thereof of 0.08 to 0.15.

4. The polycarbonate resin molding material for optical use of claim 1, wherein the pellets have a bulk density of 0.73 kg/l or more.

5. The polycarbonate resin molding material for optical use of claim 1 wherein the pellets have an air bubble evolution ratio of 30% or less, a maximum air bubble volume of 1.5 mm³ or less and an air bubble volume ratio of 2.0% or less.

6. The polycarbonate resin molding material for optical use of claim 1, wherein the pellets have an average weight value of 14 to 24 mg and a standard deviation thereof of 2.0 mg or less.

7. The polycarbonate resin molding material for optical use of claim 1, wherein the polycarbonate resin has a viscosity average molecular weight of 10,000 to 22,000.

8. The polycarbonate resin molding material for optical use of claim 1, wherein the polycarbonate resin is a polycarbonate comprising 2,2-bis(4-hydroxphenyl)propane as a main diphenol component.

9. The polycarbonate resin molding material for optical use of claim 1, where in the polycarbonate resin is a polycarbonate comprising 2,2-bis(4-hydroxyphenyl)propane as a main diphenol component and obtained by an ester exchange method.

10. The polycarbonate resin molding material for optical use of claim 1, wherein the polycarbonate resin is a polycarbonate having a phenolic hydroxyl group (OH group) content of 5 to 100 equivalents/ton.

11. The polycarbonate resin molding material for optical use of claim 1, wherein the pellets have (3) an average weight value of 13 to 26 mg and a standard deviation thereof of 2.2 mg or less.

12. An optical disk substrate formed from the polycarbonate resin molding material of claim 1.

13. An optical disk substrate formed from the polycarbonate molding material of claim 2.

14. An optical disk substrate formed from the polycarbonate resin molding material of claim 11.

15. An information recording medium comprising the optical disk substrate of claim 12.

16. An information recording medium comprising the optical disk substrate of claim 13.

17. An information recording medium comprising the optical disk substrate of claim 14.

* * * * *